United States Patent Office 3,508,793
Patented Apr. 28, 1970

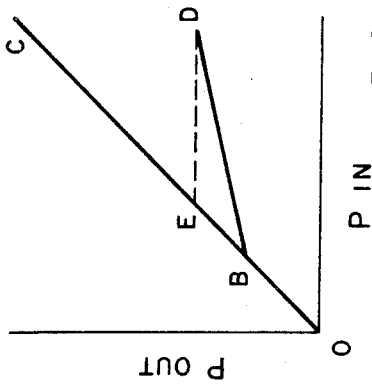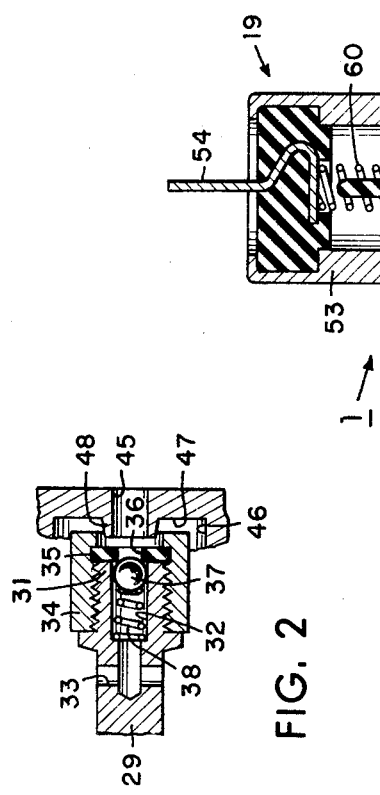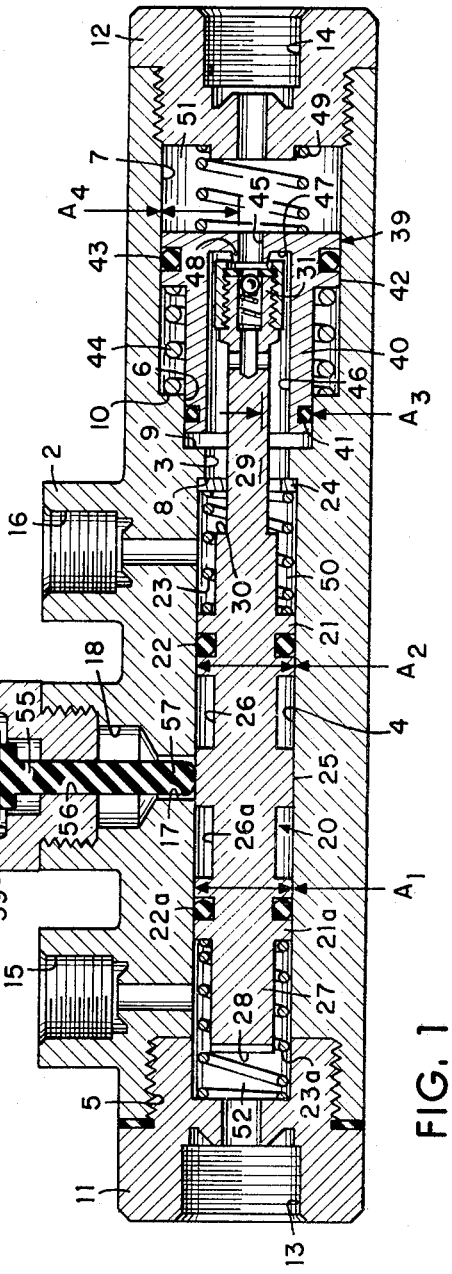

3,508,793
CONTROL VALVE
Richard C. Bueler, Glendale, Mo., assignor to Wagner Electric Corporation, Newark, N.J., a corporation of Delaware
Original application Sept. 5, 1967, Ser. No. 665,489. Divided and this application Mar. 3, 1969, Ser. No. 803,670
Int. Cl. B60t 8/26, 17/22
U.S. Cl. 303—6                                 8 Claims

ABSTRACT OF THE DISCLOSURE

A control valve including switch means for comparing the magnitudes of separate fluid pressures supplied thereto and movable toward opposed switch positions in response to a predetermined differential between the magnitudes of the separately supplied fluid pressures, and metering means for metering engagement with a portion of said switch means to control the application through said control valve of one of the supplied fluid pressures.

---

This application is a division of co-pending application Ser. No. 665,489, filed Sept. 5, 1967.

This invention relates in general to dual or split fluid pressure systems and in particular to control valves for warning of system failure and controlling pressure fluid flow through one of said systems.

In the past, dual or split fluid pressure systems were provided with a control or driving warning valve which was responsive to a fluid pressure failure in one of the dual systems to light a driver warning or dash lamp and also with another control or proportioning valve which proportioned the fluid pressure in one of the dual systems delivered to one vehicle brake set. One of the disadvantageous or undesirable features of such past constructions was that the driver warning valves and proportioning valves were separate units, which not only affected the cost of manufacturing but also the cost of assembly, both of the valves per se and on the vehicle, and the utilization of such separate valve units also presented a space factor problem since under-the-hood space in modern vehicles is becoming critical. Another of the disadvantageous or undesirable features of such past constructions was that the proportioning valve continued to proportion the fluid pressure applied to the one vehicle brake set even though a failure had occurred in the portion of the dual system connected with the other vehicle brake set. And still another disadvantageous or undesirable feature of such past constructions was that since the two valves were separate, the inherent characteristics, such as structural arrangements and/or operational movements thereof, indigenous to each, could not effectively combine or interrelate with one another.

The primary object of the present invention is to provide a control valve which overcomes the aforementioned disadvantageous or undesirable features, and this, as well as other objects and advantageous features of the present invention, will become apparent hereinafter.

In the drawings wherein like numerals refer to like parts wherever they occur:

FIG. 1 is a sectional view showing a control valve embodying the present invention in cross-section, FIG. 2 is a fragmentary sectional view taken from FIG. 1 showing the metering portion thereof in cross-section, and FIG. 3 is a graphical representation illustrating the output pressure effected by the control valve of FIG. 1 in response to the input pressure supplied thereto.

Briefly, the invention comprises a control valve having means for comparing separate fluid pressures supplied thereto and movable toward opposed translated positions in response to a predetermined differential between the separate fluid pressure magnitudes, and metering means for metering engagement with said first named means to control the application through said control valve of one of the supplied fluid pressures.

Referring now to FIG. 1, a control valve, indicated generally at 1, is provided with a housing 2 having a bore 3 interposed between opposed stepped counterbores 4, 5 and 6, 7, and shoulders 8, 9 and 10 are provided on said housing between said bore and counterbores 4, 6, and between said counterbores 6, 7, respectively. Closure members or end plugs 11, 12 are threadedly received in the open ends of counterbores 5, 7, and outlet ports 13, 14 are provided in said closure members 11, 12 connecting with the counterbores 4, 7, said outlet ports being adapted for connection with separate vehicle brake sets (not shown), such as for instance the front and rear brakes, respectively. Inlet ports 15, 16 are provided in the housing 2 connecting with the counterbore 4 adjacent to the leftward and rightward ends thereof, respectively, and said inlet ports are adapted for connection with the separate fluid pressure generating chambers of a dual or split type master cylinder (not shown) of a type well known in the art. A cross-bore 17 is provided in the housing 2 having one end intersecting the counterbore 4 adjacent the mid-portion thereof between said inlet ports 15, 16, and the other end thereof connects with a cross-counterbore 18 which is threaded at its open end to receive an electrical switch mechanism, indicated generally at 19, to be discussed hereinafter.

A switch actuating member or control piston, indicated generally at 20, is shown in its normal operating or centered position having opposed flanges 21, 21a with peripheral seals 22, 22a disposed therein and slidably received in the housing counterbore 4 between the inlet ports 15, 16, respectively, said opposed flanges having opposed substantially equal effective areas $A_1$, $A_2$ respectively responsive to fluid pressure at the inlet ports 15, 16, and opposed centering or motion impeding springs 23, 23a are respectively interposed between the piston flange 21 and an abutment or spring retainer 24 biased against the housing shoulder 8 and between the piston flange 21a and the closure member 11. The piston 20 is provided with a land 25 between the flanges 21, 21a which is slidable in the housing counterbore 4 and normally positioned beneath the housing cross-bore 17 when said piston is in its centered position, as shown, and locking grooves 26, 26a are provided in said piston on opposed sides of said land. The piston flange 21a is provided with an integral extension 27 having a free end 28 for motion limiting or abutting engagement with the closure member 11, and the piston flange 21 is provided with an integral extension 29 having an abutment or annular shoulder 30 defined thereon for motion limiting or abutting engagement with the spring retainer 24 and having a free end 31 extending coaxially into the housing counterbore 7.

Referring now also to FIG. 2, the free end 31 of the piston extension 29 is provided with an axial stepped passage 32 therethrough intersected at its leftward end by a cross-passage 33, and the peripheral portion of said piston extension adjacent to said free end 31 is threaded to receive a valve seat retaining member 34. An annular resilient valve element or seat 35 is retained against displacement between said piston extension free end 31 and the retaining member 34 and is provided with a central or axial passage 36 therethrough connecting with the axial stepped passage 32, and a uni-directional flow or check valve 37 is movable in the stepped passage 32 being biased into engagement with the valve seat 35 by a valve spring 38 of negligible compressive force interposed between said check valve and the shoulder defined by said stepped passage.

A proportioning member or metering piston, indicated generally at 39, is provided with a sleeve portion 40 slidable in the housing counterbore 6 and having a peripheral seal 41 therein in sealing engagement with said housing counterbore, and a radially extending head portion 42 is integrally connected with said sleeve portion and slidable in the counterbore 7, said head portion having a peripheral seal 43 in sealing engagement with the housing counterbore 7. A proportioning or metering spring 44 is biased between the housing shoulder 10 and the metering piston head portion 42 normally urging the metering piston 39 toward the outlet port 14, and axial stepped bores 45, 46 are provided through the metering piston 39 having a shoulder 47 therebetween defining a valve seat or element 48 for cooperative engagement with the switch piston valve seat 35. A return spring 49 of negligible compressive force is biased between the metering piston head portion and the closure member 12.

It should be noted that an annular effective area $A_3$ is defined on the metering piston between the stepped bore 45 thereof and the housing counterbore 6, said area $A_3$ being responsive to the fluid pressure at the inlet port 16, and another annular effective area $A_4$ is also defined on said metering piston between said stepped bore 45 and the housing counterbore 7, said area $A_4$ being predeterminately greater than and opposed to said area $A_3$ and responsive to the fluid pressure at the outlet port 14. Further, an inlet chamber 50 is defined in the housing bore 3 and counterbores 4, 6 and the metering piston stepped bore 46 between the switch piston flange 21 and the metering piston shoulder 47 in open pressure fluid communication with the inlet port 16, and an outlet chamber 51 is defined in the housing counterbore 7 between the metering piston head 42 and the end plug 12 in open pressure fluid communication with the outlet port 14. Another inlet chamber 52 is defined in the housing counterbore 4 between the switch piston flange 21a and the end plug 11 in open pressure fluid communication with both the inlet and outlet ports 15, 13; however, it is well known in the art to connect the inlet port 15 in parallel circuit relation between the tandem master cylinder and the front brake set (not shown) thereby obviating the necessity of providing the outlet port 13 in the housing 2.

The electrical switch 19, as previously mentioned, includes a conductive closure or plug member 53 threadedly and conductively received in the housing cross-bore 18, and a metal terminal 54 extends through said member and is insulated therefrom, said terminal having an exterior end for connection in an electrical circuit of a type well known in the art for selectively energizing a driver warning or dash lamp (not shown). A non-conductive switch operating member 55 is slidably received in a bore 56 provided in the plug member 53, said switch operating member having a lower end or follower portion 57 extending through the housing cross-bore 17 for engagement with the piston land 25 and having a conductive contact 58 on the upper end portion thereof for electrical engagement with another contact 59 on the plug member. To complete the description of the control valve 1, a current carrying spring 60 is interposed between the interior end of the terminal 54 and the switch member contact 58 urging it toward engagement with the contact 59 and urging the follower portion 57 of the switch member 55 into positioning engagement with the piston land 25.

In the operation with the component parts of the control valve 1 positioned as shown in FIG. 1 and as described hereinabove, independent or separately supplied input fluid pressures $P_1$, $P_2$ normally having substantially equal magnitudes are applied upon operator actuation of the tandem or split system type master cylinder (not shown) to the inlet ports 15, 16, respectively, of said control valve. The input fluid pressure $P_1$ flows from the inlet port 15 into the inlet chamber 52 acting on the switch piston area $A_1$ to establish a force $P_1A_1$, and the input fluid pressure $P_2$ flows from the inlet port 16 into the inlet chamber 50 acting on the switch piston area $A_2$ to establish a force $P_2A_2$ opposed to the force $P_1A_1$. The inlet fluid pressure $P_2$ in the inlet chamber 50 acts also on the effective area $A_3$ of the metering piston 39 to establish another force $P_2A_3$ and also flows through the switch piston stepped bore 45 into the outlet chamber 51 and therefrom to the outlet port 14 to establish an output fluid pressure $P_0$. The output fluid pressure $P_0$ at the outlet port 14 and in the outlet chamber 51 acts on the effective area $A_4$ of the metering piston 39 to establish an output force $P_0A_4$ which is opposed to the input force $P_2A_3$ acting on said metering piston. Since the input fluid pressures $P_1$, $P_2$ and the areas $A_1$, $A_2$ have previously been respectively defined as substantially equal, it is obvious that the force $P_1A_1$ is substantially equal and opposed to the force $P_2A_2$; therefore, the switch piston 20 is relatively unaffected by the fluid pressures acting thereon and will remain substantially in its centered position, as shown. Since the input and output fluid pressures $P_2$, $P_0$ are initially equal and since the area $A_4$ is greater than the area $A_3$ of the metering piston 39, it is obvious that the output force $P_0A_4$ is greater than the input force $P_2A_3$; however, the compressive force Fc of the metering spring 44 prevents movement of the metering piston 39 until the input and output fluid pressures $P_2$, $P_0$ exceed a predetermined value, as shown by the line OB in the graphical representation of FIG. 2. When the predetermined value B of the input and output fluid pressures $P_1$, $P_0$ is attained, the output force $P_0A_4$ overcomes the additive input and spring forces $P_2A_3$, Fc to move the metering piston 39 from its original position in a leftward direction toward an operative or metering position to store the energy of the spring 44. This leftward movement of the metering piston 39 engages the valve element 48 thereof with the switch piston valve element 35 to isolate the input fluid pressure $P_2$ in the inlet chamber 50 from the output fluid pressure $P_0$ in the output chamber 51, and upon the engagement of said valve seat and valve element, the input force $P_2A_3$ and the spring force Fc are substantially equal to and balanced by the output force $P_0A_4$.

From the graphical representation in FIG. 3, it is obvious that increases in the magnitude of the input fluid pressure $P_2$ in excess of the predetermined value B, as shown by the line OBEC, will result in proportionally reduced increases in the output fluid pressure $P_0$, as shown by the line BD. For instance, when the input fluid pressure $P_2$ is increased to a value in excess of the predetermined value B, the input force $P_2A_3$ is correspondingly increased and additive to the spring force Fc to overcome the output force $P_0A_5$; therefore, the metering piston 39 is moved rightwardly toward a metering position disengaging the valve element 48 thereof from the switch piston valve element 35 to effect a metered application of the increased input fluid pressure $P_2$ through the metering piston stepped bore 45 and the outlet chamber 51 to the outlet port 14 to effect a proportional increase of the output fluid pressure $P_0$ in a predetermined ratio with input fluid pressure $P_2$ at the inlet port 16, as shown by the line BD in the graph of FIG. 2 wherein $$P_0 = \frac{P_2A_3 + Fc}{A_4}$$

Of course, the increased output fluid pressure $P_0$ effects a corresponding increase in the output force $P_0A_4$, and when the increased output force $P_0A_4$ attains an increased value substantially equal to that of the increased input force $P_2A_3$ and the additive spring force $Fc$, the metering piston 39 is again moved leftwardly to re-engage the valve element 48 thereof with the switch piston valve element 35 to again isolate the increased input and output fluid pressures $P_2$, $P_0$. It is, of course, obvious that the metering piston 39 will be responsive to further increases in the input fluid pressure $P_2$ to effect further corresponding proportional increases in the output fluid pressure $P_0$ in the same manner as previously described, and it should also be noted that as input fluid pressure $P_2$ is increased, the separate input fluid pressure $P_1$ is also equally increased to maintain the forces $P_2A_2$ and $P_1A_1$ substantially equal across the switch piston 20 obviating displacement movement thereof from its centered position.

When the split system master cylinder is deactuated, the input fluid presures $P_1$, $P_2$ are vented to atmosphere, said input fluid pressure $P_2$ flowing from the input chamber 50 to the inlet port 16 and said input fluid pressure $P_1$ flowing from the outlet port 13 through the chamber 52 to the inlet port 15. In this manner, the forces $P_1A_1$ and $P_2A_2$ acting on the switch piston 20, as well as the input force $P_2A_3$ acting on the metering piston 39, are eliminated. When the magnitude of the input fluid pressure $P_2$ is so reduced to the value E on the line OBEC in the graph of FIG. 3, which is the value substantially equal to that of the output fluid pressure $P_0$, a pressure differential is established between the input and output fluid pressures $P_2$, $P_0$ across the check valve 37, and the output fluid pressure $P_0$ acting on the effective area of the check valve 37 displaces said check valve from engagement with the valve element 35 against its spring 38 to open the valve element passage 36 and permit return flow of the displaced output fluid pressure $P_0$ from the outlet port 14 through the outlet chamber 51, the stepped bore 45, the valve element passage 36 and the switch piston stepped passage 32 and cross-passage 33 into the inlet chamber 50 and therefrom to the inlet port 16. When the return flow of the output fluid pressure $P_0$ reduces the magnitude thereof to a value wherein the output force $P_0A_4$ is overcome by the compressive force $Fc$ of the spring 44, said spring 44 moves the metering piston 39 rightwardly against the force of the return spring 49 toward its original position disengaging the valve element 48 thereof from the switch piston valve element 35 establishing open pressure fluid communication between the inlet and outlet ports 14, 16 and thereby eliminating the output force $P_0A_4$. Upon disengagement of the metering piston valve element 48 from the switch piston valve element 35, the pressure differential thereacross is eliminated and the check valve spring again re-engages the check valve 37 with the switch piston valve element 35 closing the passage 36 thereof. The return flow of the output fluid pressure $P_0$ is illustrated in the graph of FIG. 2 by the dotted line DE and the line EBO.

In the event that a sustained pressure differential is established between the separately supplied input fluid pressures $P_1$, $P_2$ due to a malfunction of the split system master cylinder, leaks or the like, wherein the magnitude of the supplied fluid pressure $P_2$ exceeds that of the supplied fluid pressure $P_1$ by a predetermined value, the force $P_2A_2$ acting on the switch piston will, of course, overcome the reduced opposing force $P_1A_1$ acting thereon and will displace said switch piston from its centered position leftwardly toward its leftward displaced or translated position engaging the switch piston abutment 28 with the end plug 11. Of course, due to the failure of the input fluid pressure $P_1$, it is desirable to obviate the proportioning function of the proportioning member 39 in order to attain an unaltered or maximum fluid pressure at the outlet port 14, i.e., wherein $P_0$ is equal to $P_2$. It should be noted that the distance of the translatory movement between the switch piston abutment end 28 and the end plug 11 is greater than the distance of the movement between the leftward end of the metering piston 39 and the housing shoulder 9; therefore, it is obvious that when the control piston 20 is in its leftward translated or displaced position, the proportioning piston valve element 48 cannot engage the switch piston valve element 35 to effect the metered application of the input fluid pressure between the input and output ports 16, 14. With the switch piston 20 in its leftwardly translated position, the output force $P_0P_4$ will overcome the input force $P_2A_3$ respectively acting on the proportioning piston 39 to effect movement thereof against the spring 44 toward a disabled position abuttingly engaging the leftward end of the proportioning piston sleeve member 40 with the housing shoulder 9; however, as previously mentioned, this movement of the proportioning piston 39 to its disabled position cannot engage the valve element 48 thereof with the switch piston valve element 35 so that the proportioning piston stepped bore 45 remains open to permit the unmetered or unrestricted flow of the input fluid pressure $P_2$ to the output port 14 wherein $P_0$ and $P_2$ are equal. The movement of the switch piston 20 to its leftwardly translated position displaces the positioning land 25 from beneath the housing cross-bore 17 and aligns the locking groove 26 therewith, and thereafter the compressive force of the switch spring 60 displaces the follower end 57 of the spring operating member 55 downwardly into the housing counterbore 4 and into locking engagement with the locking groove 26 to prevent the return movement of said switch piston toward its centered position in response to the compressive force of the centering spring 23a when the split system master cylinder is de-actuated to eliminate the input fluid pressures $P_1$, $P_2$. This downward movement of the switch operating member 55 also engages the contact 58 thereof with the cooperating contact 59 of the switch plug member 53 to complete the electrical circuit and energize the driver warning dash lamp (not shown). In order to re-center the switch piston 20 when the fluid pressure deficiency of the system is corrected, the plug member 53 of the switch 19 is threadedly disengaged from the housing cross-bore 18 to disengage the follower end 57 of the switch operating member 55 from locking engagement with the locking groove 26, and the centering spring 23a thereafter returns the switch piston 20 to its centered position with the positioning land 25 thereof beneath the housing cross-bore 17 for positioning engagement with the switch piston operating member follower end 57 when the switch plug member 53 is manually re-engaged with the housing cross-bore 18.

In the event that an oppositely directed differential is established between the input fluid pressures due to a malfunction of the split master cylinder, leaks or the like, wherein the magnitude of the supplied fluid pressure $P_1$ exceeds that of the supplied fluid pressure $P_2$ by a predetermined value, the force $P_1A_1$ acting on the switch piston 20 will, of course, overcome the opposing reduced force $P_2A_2$ acting thereon to move said piston from its centered position toward its rightward displaced or translated position. This rightward displacement of the switch piston 20 initially engages the valve element 35 thereof with the proportioning piston valve seat 48 and the rightward end of the retainer 34 with the proportioning piston shoulder 47 to thereafter drive the proportioning piston 39 rightwardly against its return spring 49 toward a disabled position in the counterbore 7. It should be noted that this concerted rightward movement of the switch piston 20 and the proportioning piston 39 toward their rightward displaced positions also disables the metering spring 44 and is limited by the engagement of the shoulder 30 on the switch piston extension 31 with the spring retainer 24. This concerted rightward movement also displaces the positioning land 25 from the follower end 57 of the switch operating member 51 to permit displacement thereof by the compressive force of the switch spring 60 into locking engagement with the locking groove 26 to maintain said switch piston 20 in its rightward displaced position against the compressive force of the centering spring 23. Of course, the downward movement of the switch operating member 55 again will move the contact 58 thereof into engagement with its cooperating contact 59 to complete the electrical circuit and energize the driver warning dash lamp (not shown).

From the foregoing, it is now apparent that a control valve meeting the objects and advantageous features set forth hereinabove, as well as other objects and advantageous features, is provided and that changes as to the precise configurations, shapes or other details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, metering means movable in said housing to control the application through said housing of fluid pressure supplied thereto including a valve member, other means in said housing including another valve member for engagement with said first named valve member, said metering means being initially movable in response to the supplied and applied fluid pressures of a predetermined value acting thereon toward an isolating position in said housing engaging said first named valve member with said other valve member and isolating the supplied and applied fluid pressures and said metering means also being thereafter further movable in response to increases in the supplied fluid pressure in excess of the predetermined value toward a metering position disengaging said first named valve member from said other valve member and effecting a metered increase in the applied fluid pressure in a predetermined ratio with the increased supplied fluid pressure in excess of the predetermined value, passage means in said other means extending through said other valve member for the return flow of the applied fluid pressure when said first named and other valve members are engaged, and uni-directional valve means movable in said passage means and subjected to the supplied and applied fluid pressures for controlling the return flow of the applied fluid pressure therethrough, said valve means being movable in response to the applied fluid pressure acting thereon toward a position in said passage means establishing the return flow through said passage means of the applied fluid pressure to reduce the magnitude thereof upon the reduction of the magnitude of the supplied fluid pressure to a value less than that of the applied fluid pressure.

2. The control valve according to claim 1, wherein said metering means and other means define with said housing a flow passage therethrough for the supplied fluid pressure, said other valve member on said other means being in said flow passage, and said first named valve member on said metering means being about said flow passage, said first named valve member being movable with said metering means into metering engagement with said other valve member to close said flow passage isolating the supplied and applied fluid pressures.

3. The control valve according to claim 1, other passage means in said metering means for the application therethrough of the supplied fluid pressure, said first named valve member on said metering means being about said other passage means, said first named valve member being movable with said metering means and into engagement with said other valve member to close said other passage means isolating the supplied and applied fluid pressures and being disengaged from said other valve member to open said other passage means to effect the metered increase in the applied fluid pressure, and said first named and other passage means being connected in pressure fluid communication for the return flow of the applied fluid pressure upon the engagement of said first named and other valve members.

4. The control valve according to claim 1, comprising an input chamber defined in said housing between said other means and metering means for receiving the supplied fluid pressure, said metering means defining with said housing an output chamber for receiving the applied fluid pressure and opposed to said input chamber, other passage means in said metering means connected between said input and output chambers, said first named valve member on said metering means being about said other passage means facing said input chamber and said other valve member on said other means being in said input chamber said first named valve member being movable with said metering means and into metering engagement with said other valve member closing communication between said input and output chambers to isolate the supplied and applied fluid pressures, and said first named passage means being in pressure fluid communication with each of said input and output chambers when said first named and other valve members are engaged.

5. The control valve according to claim 1, comprising opposed input and output sides on said metering means respectively defining opposed input and output differential areas, other passage means in said metering means between said opposed input and output sides for the application therethrough of the supplied fluid pressure, said first named valve member on said metering means being about said other passage means, resilient means engaged with said metering means and normally urging said metering means toward a position disengaging said first named valve member from said other valve member, said metering means being initially movable toward its isolating position against the force of said resilient means to engage said first named valve member with said other valve member and close said other passage means isolating the supplied and applied fluid pressures when the magnitudes thereof respectively acting on said input and output opposed differential areas attain the predetermined value and said metering means also being thereafter further movable toward its metering position to disengage said first named valve member from said other valve member and open said other passage means to effect the metered increase in the applied fluid pressure in response to the increases in the supplied fluid pressure in excess of the predetermined value acting on said input opposed differential area and assisted by the force of said resilient means, said first named passage having one end connecting with said other passage means and subjected to the applied fluid pressure and the other end thereof subjected to the supplied fluid pressure when said first named and other valve members are engaged, a valve seat on said other means about said first named passage means between the one and other ends thereof, and other resilient means normally urging said valve means into engagement with said other valve seat closing said first named passage means, said valve means being movable against said other resilient means in response to the applied fluid pressure acting thereon toward a position in said first named passage means disengaged from said other valve seat to establish the return flow of the applied fluid pressure through said first named passage means upon the reduction of the magnitude of the supplied fluid pressure acting on said valve means to the value less than that of the applied fluid pressure.

6. The control valve according to claim 1, comprising resilient means in said housing and engaged with said metering means, said metering means being movable toward its position isolating the supplied and applied fluid pressures against the force of said resilient means and the force of said resilient means assisting the supplied fluid pressure in excess of the predetermined value acting on said metering means to urge said metering means toward its metering position.

7. The control valve according to claim 1, comprising opposed areas on said metering means for respective subjection to the supplied and applied fluid pressures, said metering means being movable toward its isolating position in response to the supplied and applied fluid pressures of the predetermined value respectively acting on said opposed area and being thereafter further movable in response to the supplied fluid pressure in excess of the predetermined value acting on one of said opposed areas toward its metering position against the applied fluid pressure acting on the other of said opposed areas.

8. The control valve according to claim 7, wherein said other opposed area is predeterminately greater than said one opposed area."

References Cited

UNITED STATES PATENTS

| | | |
|---|---|---|
| 2,408,513 | 10/1946 | Gunderson. |
| 3,245,729 | 4/1966 | Shellhause _____ 303—6 X |
| 3,315,469 | 4/1967 | Stelzer _____ 303—6 X |
| 3,360,004 | 12/1967 | Lewis et al. |

FERGUS S. MIDDLETON, Primary Examiner

J. J. McLAUGHLIN, Jr., Assistant Examiner

U.S. Cl. X.R.

60—54.5; 137—493.9, 505.25; 188—152